United States Patent
Löpponen

[11] Patent Number: 5,590,400
[45] Date of Patent: Dec. 31, 1996

[54] METHOD OF SEARCHING FOR A SIGNALLING CHANNEL IN A RADIO SYSTEM

[75] Inventor: Jussi Löpponen, Helsinki, Finland

[73] Assignee: Nokia Telecommunications OY, Espoo, Finland

[21] Appl. No.: 347,311

[22] PCT Filed: Mar. 29, 1994

[86] PCT No.: PCT/FI94/00118

§ 371 Date: Nov. 30, 1994

§ 102(e) Date: Nov. 30, 1994

[87] PCT Pub. No.: WO94/23544

PCT Pub. Date: Oct. 13, 1994

[30] Foreign Application Priority Data

Mar. 30, 1993 [FI] Finland ................................. 931434

[51] Int. Cl.$^6$ ................................. H04Q 7/00
[52] U.S. Cl. ................. 455/34.2; 455/54.1; 455/34.1
[58] Field of Search ................. 455/34.1, 34.2, 455/33.1, 53.1, 54.1, 54.2, 56.1, 33.4; 370/95.1, 95.3; 379/59, 60

[56] References Cited

U.S. PATENT DOCUMENTS

| | | |
|---|---|---|
| 4,434,506 | 2/1984 | Fujiwara et al. . |
| 4,633,509 | 12/1986 | Scheinert . |
| 4,903,320 | 2/1990 | Hanawa ................. 455/34.2 |
| 5,212,803 | 5/1993 | Uddenfeldt et al. ................. 455/33.1 |
| 5,235,598 | 8/1993 | Sasuta ................. 370/110.1 |
| 5,239,678 | 8/1993 | Grube et al. . |
| 5,276,730 | 1/1994 | Cimini, Jr. et al. . |
| 5,329,530 | 7/1994 | Kojima ................. 370/85.7 |
| 5,408,682 | 4/1995 | Ranner et al. ................. 455/32.1 |

FOREIGN PATENT DOCUMENTS

| | | |
|---|---|---|
| 470152 | 11/1993 | Sweden . |
| 93100602 | 5/1993 | WIPO . |
| 9310643 | 5/1993 | WIPO . |

*Primary Examiner*—Andrew Faile
*Assistant Examiner*—Lee Nguyen
*Attorney, Agent, or Firm*—Cushman Darby & Cushman, L.L.P.

[57] ABSTRACT

A method of searching for a signalling channel in a radio system including a mobile exchange, base stations connected therewith, subscriber stations that are connected with the base stations and communicate with the radio system via the channels of the base station, i.e. via traffic channels and non-dedicated control channels. The method includes the following steps: a first subscriber station registered in a first base station listens to a signalling channel of the first base station, and the radio system allocates the signalling channel to a second subscriber station for use as a traffic channel since the other channels of the first base station are busy. To improve the efficiency of the radio system, when the first subscriber station detects that the signalling channel used by it is assigned as a traffic channel for communication between the second subscriber station and the first base station, the first subscriber station stays to listen for a predetermined time to each channel of the first base station in succession, tuning its radio unit to a channel and monitoring whether the base station is transmitting on the channel radio traffic typical of a signalling channel.

2 Claims, 5 Drawing Sheets

METHOD OF SEARCHING FOR A SIGNALLING CHANNEL IN A RADIO SYSTEM

FIELD OF THE INVENTION

The invention relates to a method of searching for a signalling channel in a radio system comprising a mobile exchange, base stations connected therewith, subscriber stations that are connected with the base stations and communicate with the radio system via the channels of the base station, i.e. via traffic channels and non-dedicated control channels; the method comprising the following steps: a first subscriber station registered in a first base station listens to a signalling channel of the first base station, and the radio system allocates said signalling channel to a second subscriber station for use as a traffic channel since the other channels of the first base station are busy.

BACKGROUND OF THE INVENTION

The invention concerns cellular radio systems, such as mobile phone systems and PMR systems (PMR=private mobile radio), i.e. cellular radio networks in which the area covered by the network is divided into radio cells. The subscribers roaming in the area of these radio cells communicate with the system when they are within the coverage area of the base stations located in the radio cells.

In a system like this, a subscriber station, such as a mobile phones, located in a radio cell listens or tunes the receiver unit of its radio to the frequency of a signalling channel of a base station located in the radio cell. A signalling channel is used for exchanging messages concerning the connection establishment between a subscriber station and a base station. On the basis of connection establishment, the system controller of the cellular radio network assigns the subscriber stations to actual traffic channels, in which the actual transfer of information, i.e. speech or data, takes place. Traffic between a base station and subscriber stations takes place on radio channels that are implemented such that downlink traffic (from a base station to a subscriber station) takes place at a first frequency, and uplink traffic (from a subscriber station to a base station), at a second frequency. In FDMA systems (FDMA=Frequency Division Multiplexing Access) a channel thus means a pair of channels used for one conversation. In a TDMA system (TDMA=Time Division Multiplexing Access) a channel means a carrier and its time slot.

It is typical of channels provided between base stations and subscriber stations that there is a limited number of channels available since there are few radio frequencies and/or time slots. It is thus typical of cellular radio systems that one—possibly the only—signalling channel of a base station can be converted to a traffic channel, e.g. a speech or data channel, when a traffic channel is needed for a call between a subscriber station and a base station and the actual traffic channels of the base station are busy. Typically, this kind of procedure is followed in areas where the traffic and subscriber density is low and where the number of radio channels is small; the use of a signalling channel as a traffic channel significantly improves the transmission capacity of the system. When a signalling channel that can be converted to a traffic channel (i.e. a non-dedicated control channel) is used as a traffic channel, signalling messages cannot be transmitted on said channel unless the channel has an inband signalling channel, such as an associated signalling channel, whereby it is possible to transmit short signalling messages in the middle of speech or data to the parties listening to the channel (base station and subscriber station). However, it is not possible to set up new calls on the associated signalling channel nor to transmit data messages on it since the transmission capacity of said channel is very limited. Typically all the channels of a base station can function as signalling channels or traffic channels when necessary and that if all the channels of the base station function as traffic channels at the same time, any channel that is released from use as a traffic channel can be converted to a new signalling channel for traffic between the base station and the subscriber stations roaming within its coverage area. This is optimal in respect of formation of a new signalling channel: a new signalling channel is formed without delay. When a channel like this is used as a signalling channel, signalling messages concerning all the services of a mobile phone system can be transmitted thereon. It should be noted that a radio system may simultaneously comprise base stations with dedicated control channels only and base stations with non-dedicated control channels.

It is typical of cellular radio systems, particularly of PMR systems, that the radio cells or the coverage areas of the base stations intersect or overlap, whereby a subscriber station can select—by measuring the signals transmitted on the signalling channels by the base stations—the base station whose signalling channel (control channel) it will start to listen to. The coverage areas of the base stations may overlap heavily. The coverage areas overlap especially in low-lying and flat areas when great transmission power is used, e.g. in PMR systems.

Due to the overlapping of the coverage areas of the base stations in the prior art, when all the channels of a base station are converted to traffic channels, the subscriber stations which have listened to a base station channel that has functioned as a signalling channel but has been converted to a traffic channel move to a signalling channel of an adjacent base station. Since in normal mobile phone traffic, tele-communication links, such as speech or data links, are established from and to subscriber stations and since the adjacent base stations have few free traffic channels or none at all when the traffic load is normal/optimal, all the traffic channels and non-dedicated control channels of the adjacent base stations are quickly allocated for use as traffic channels. Those subscriber stations that do not find a signalling channel to which they could be tuned or a traffic channel on which they could communicate with the base station start to tune their radio units to the frequencies of the different base stations, attempting to find a free signalling channel and a traffic channel if necessary and simultaneously attempting to register in the network and send the parameters for establishing a telecommunication link with several base stations in succession yet always failing since the other base stations do not have free channels either. The subscriber stations thus roam between the coverage areas of different base stations, causing instability and unnecessary signalling load in the network. Further, the fact that the subscriber stations roam to listen to the signalling channels of base stations that are not their original base stations may lead to a situation where not a single subscriber station is listening to the signalling channel of the original base station when a signalling channel or even a traffic channel of said original base station becomes available, whereby the network has a free signalling channel and traffic channel although at the same time the subscriber stations roaming in the area have too few traffic channels in their use. The network capacity is thus divided unevenly and resources are wasted. The subscriber stations detect this as a decrease in the quality of service: it is difficult for them to find a signalling channel at a base station and to establish telecommunication links, and their call set-up attempts are interrupted since often the signalling channels on which a subscriber station attempts to set up a call, i.e. to send messages necessary in call set-up, is allocated to another subscriber station for use as a traffic channel.

BRIEF DESCRIPTION OF THE INVENTION

The problem to be solved by the present invention is that when a signalling channel between a base station and a subscriber station is allocated to another subscriber station for use as a traffic channel, the subscribers that have listened to said signalling channel have to hunt for signalling channels of other base stations to communicate with the radio system and, when necessary, to find a traffic channel for traffic with the base stations. Attempts to establish connection made by these subscribers searching for new signalling channels and any free traffic channels are interrupted, and the subscriber stations have to search for new signalling channels in other base stations and repeatedly re-register in the mobile phone network through the different base stations of the network.

This new kind of method of searching for a signalling channel in a radio system is characterized by the following steps: a first subscriber station detects that the signalling channel used by it is assigned as a traffic channel for communication between a second subscriber station and a first base station, the first subscriber station stays to listen for a predetermined time to every channel of the first base station in succession, tuning its radio unit to a channel and monitoring whether the base station is transmitting on the channel radio traffic typical of a signalling channel.

The invention further concerns a method of searching for a signalling channel in a radio system, the method comprising the following steps: a first subscriber station detects that the signalling channel used by it is assigned as a traffic channel for communication between a second subscriber station and a first base station, and the first subscriber station stays to listen for a predetermined time to the inband signalling on said signalling channel converted to a traffic channel.

The invention is based on the idea that when a non-dedicated control channel of the base station is allocated to a second subscriber station, the first subscriber station detects this and stays to listen to the channels of the original base station, waiting for a predetermined time that one of the channels of the base station is released and can function as a new signalling channel and further as a traffic channel, instead of starting to search the channels of the base stations that are adjacent to the original base station for a free signalling channel and a possible new traffic channel, as is done in the prior art. The invention is useful since in PMR systems the call duration is often less than 30 seconds, whereby it is probable that when a base station does not have any free signalling channels, a channel that has been used as a traffic channel becomes available after a waiting period of less than 15 seconds and can then be used as a signalling channel between a subscriber station and the base station and, if necessary, further converted to a traffic channel.

The advantage of this invention is that the technical disadvantages involved in the prior art solutions can be eliminated. The advantages of the method of the invention are the following.

The method of the invention allocates or divides the radio resources or in practice the telecommunication channels of the base stations in the radio system in a better and more effective way than the prior art solutions. This is due to the fact that the method according to the invention prevents the subscriber stations from unnecessarily registering and tuning to any signalling channels of different base stations. The method of the invention also makes sure that the traffic transmitting capacity of the radio network is not significantly reduced even if the traffic load increases unexpectedly. The method of the invention thus sees to it that the traffic transmitting capacity of the radio network does not collapse as the traffic load increases.

The method of the invention further enables establishment of telecommunication links, typically calls, initiated by subscriber stations in a situation where a subscriber station has attempted to initiate a call but the signalling channel of the base station with which the subscriber station has attempted to communicate has been converted to a traffic channel, whereby said subscriber station has lost the signalling channel on which it has attempted to communicate with the mobile phone system via a base station. In a situation like this, the calls have been interrupted in the prior art, whereas in the present invention the connection establishment can be continued when the subscriber station has found a new signalling channel at its own original base station within the roaming period.

A further advantage of the invention is that the time the subscriber station listens to a signalling channel of its own original base station can be set by the system controller, mobile exchange, of the mobile phone system. The time is called a roaming period. Since in the invention the roaming period can be controlled, the system may be implemented such that it monitors the starting times of the calls passing through the base station and statistically calculates the probable ending time of each call based on this information. On the basis of the calculated ending time, the system determines how long the subscriber station listens to a signalling channel of its own original base station. If it is probable that one of the channels of the base station is released within a reasonable time, the roaming period should be set such that the subscriber stations continues to listen to the original base station so long that a signalling channel of the base station is released and a signalling channel, optionally converted to a traffic channel, becomes available to the subscriber station. Correspondingly, if it is probable that one of the channels of the base station is not released within a reasonable time, the roaming period of the subscribers listening to the base station is set to be as short as possible, whereby said subscribers move to listen to the carriers of the adjacent base stations without delay, searching the carriers for free signalling channels and any traffic channels needed.

BRIEF DESCRIPTION OF THE FIGURES

The invention will be described in greater detail in the following, with reference to the attached drawings, in which.

DETAILED DESCRIPTION OF THE INVENTION

Figure 1:
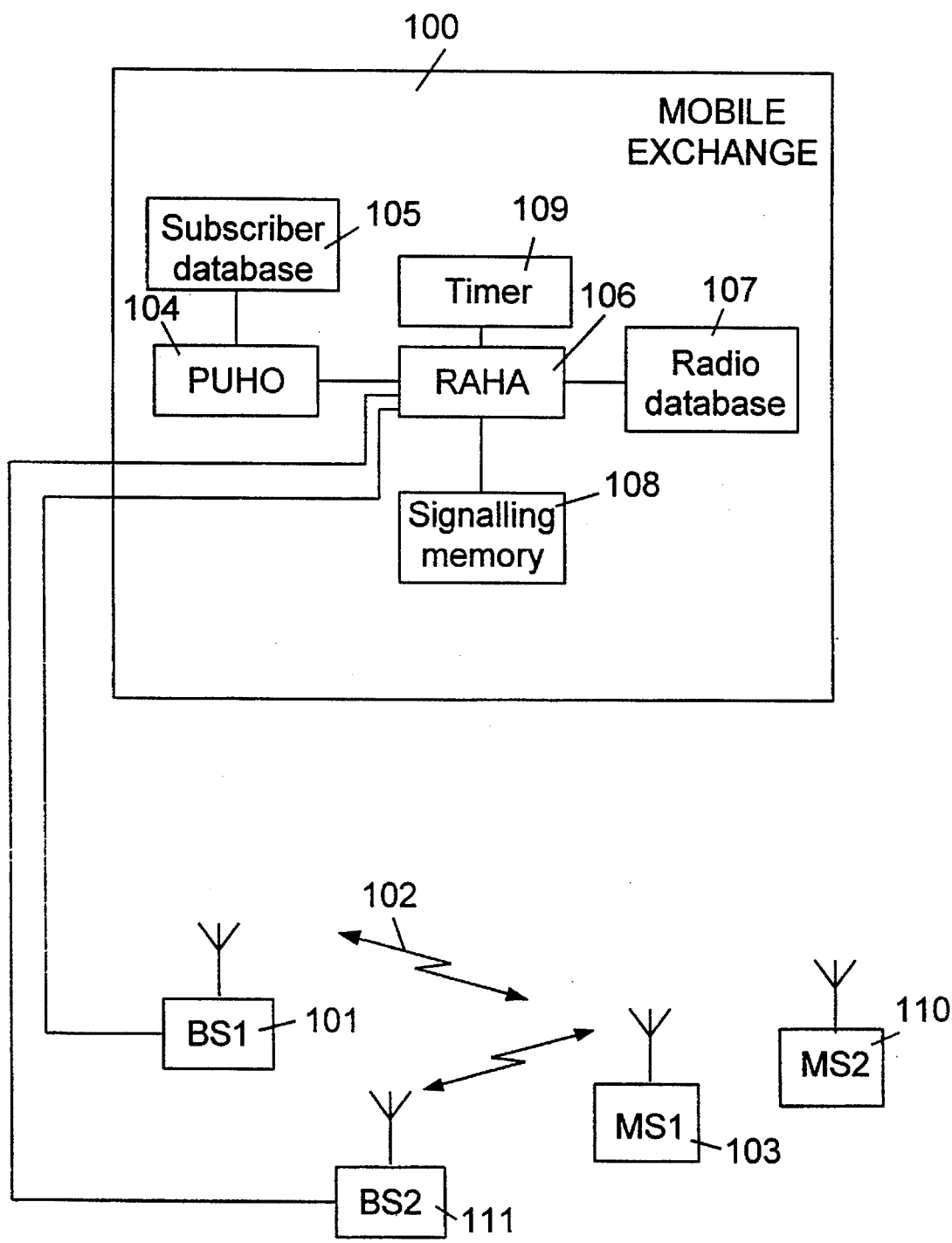
FIG. 1 shows a block diagram of a radio system according to the invention and of its mobile exchange.

FIG. 1 shows a block diagram of a radio system according to the invention and of its mobile exchange 100. With the mobile exchange 100 is connected a first base station BS1, 101 of the radio system; and a first subscriber station MS1, 103, typically a mobile phone, such as a portable phone, communicates with said base station over a radio path 102. At least one other subscriber station MS2, 110 communicates with the same base station. Said base station BS1, 101 is here also called the original base station since it is the base station with which the subscriber station MS1, 103 originally communicates before said subscriber station MS1, 103 starts to listen to the signalling channels of other base stations, here of a second base station BS2, 111 connected with the mobile exchange 100. The mobile exchange comprises a call control unit PUHO 104, which sets up calls, controls their set-up and controls the switching field of the mobile exchange. With the call control unit 104 is connected a subscriber database 105, which may also be located outside the mobile exchange 100. With the call control unit 104 is connected a radio resource managing unit RAHA 106. With the radio resource managing unit is connected a radio database 107, in which data about the radio resources of the system are stored. The radio resource managing unit RAHA 106 initializes the base stations in accordance with the data contained in the radio database 107, controls the state of the base stations and radio channels, the faults occurring therein and the loading of said resources, and transmits the necessary information about the radio network to the mobile phones to enable finding of base stations. Further, the radio resource managing unit RAHA 106 determines the base station channels, i.e. the radio frequency, and the actual equipment at a base station that are employed for a call. In another embodiment of the invention, with the radio resource managing unit RAHA 106 is also connected a timer 109 that measures the roaming period, i.e. the time that the subscriber station has to listen—according to the invention—to a channel of its own original base station, typically a signalling channel that has been used earlier but has been converted to a traffic channel, or all or some of the channels of the base station in a specified order to find a new signalling channel.

The mobile exchange 100 according to the invention further comprises a signalling memory 108 connected with the call control unit PUHO 104. In the memory are stored the signalling messages that the mobile exchange wants to send to the subscriber station MS1, 103 that has been the last to listen to the signalling channel of its base station, which no longer has a signalling channel since it has been allocated to another subscriber station for use as a traffic channel.

Figure 2:
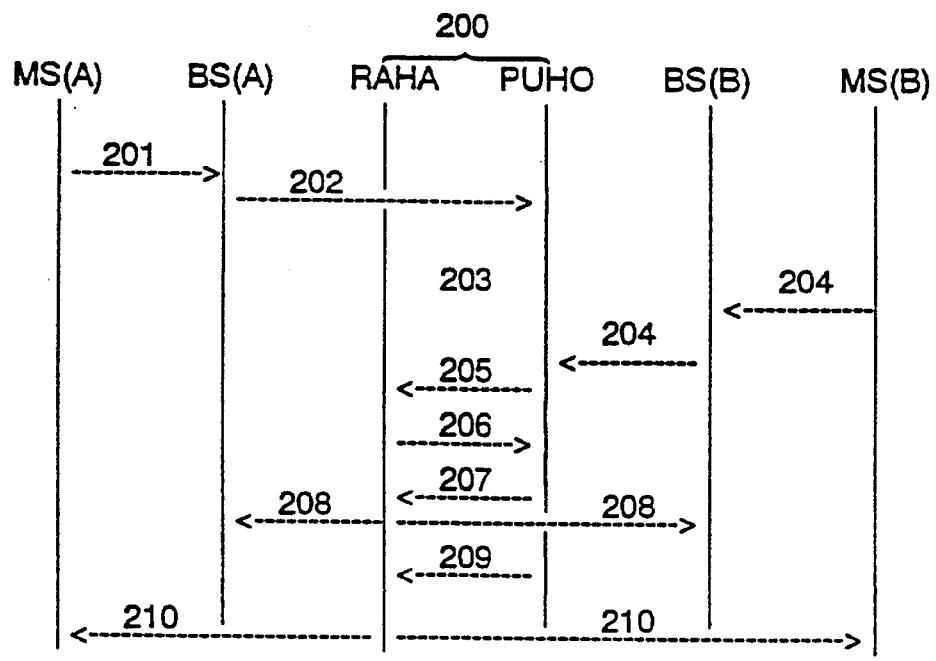
FIG. 2 shows a signalling diagram of the operation of a mobile exchange according to the prior art during a call set-up.

FIG. 2 shows a signalling diagram of the operation of a mobile exchange according to the prior art during a call set-up. A subscriber station MS(A) (A-subscriber) wanting to set up a call sends a call set-up request (201) to a base station BS(A), which forwards 202 the request to the call control unit PUHO of a mobile exchange 200 (FIG. 1; 100). The call control unit PUHO checks 203 the subscriber data of both the A- and B-subscriber station in the subscriber database and pages the subscriber station BS(B). The paging is carried out by sending a paging message on the signalling channel of the base station that is assumed to communicate with the B-subscriber. Having been located, the B-subscriber sends through a call control unit PUHO 204 an acknowledgement that it (MS(B)) is ready to receive a call. The call control unit PUHO sends a request 205 to the radio resource managing unit RAHA, requesting that a channel be assigned for traffic between the A- and B-subscriber station. The radio resource managing unit RAHA responds by sending a message 206 by which it allocates the channel resources needed for establishing the desired telecommunication link to the call control unit PUHO. The call control unit PUHO commands 207 the radio resource managing unit RAHA to initialize the radio units needed. The radio resource managing unit RAHA performs the initialization by sending initialization commands 208 to the base stations BS(A) and BS(B), which correspond to the base stations BS1 and BS2 of FIG. 1. The call control unit then sends a connect message 209 to the radio resource managing unit RAHA, which sends connect messages 210 to the A- and B-subscriber stations, which initiate a call by tuning to a chosen traffic channel.

Figure 3:
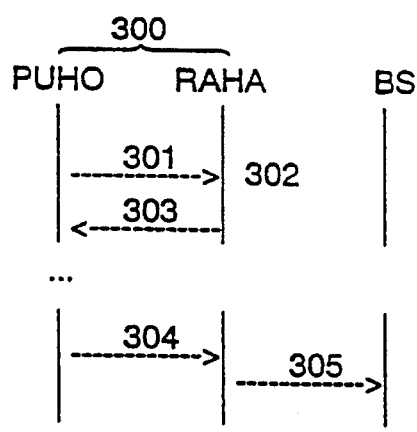
FIG. 3 shows a transaction diagram concerning the conversion of a non-dedicated control channel to a traffic channel, FIG. 4. illustrates storing of signalling messages for the roaming period.

FIG. 3 shows a transaction diagram concerning the conversion of a non-dedicated control channel to a traffic channel. The call control unit PUHO located in a mobile exchange 300 (FIG. 1) requests 301 the radio resource managing unit RAHA to assign a channel for communication between a subscriber station and a base station of the mobile phone system. In this embodiment, the signalling channel of the base station BS can also function as a traffic channel, i.e. it is a so called non-dedicated control channel. Having received the request 301, the radio resource managing unit RAHA detects 302 that a call can be established but only by converting the last free channel of the base station, i.e. the non-dedicated control channel, to a traffic channel. The radio resource managing unit RAHA thereby decides to convert the signalling channel to a traffic channel and informs 302 the call control unit PUHO accordingly 303. The call control unit PUHO sends a connect message 305 to the radio resource managing unit RAHA. When the radio resource managing unit RAHA receives the connect message 304, it sends a connect message 305 to the mobile phones and simultaneously updates the database of the base station site BS to indicate that the base station no longer has a control channel. The radio resource managing unit RAHA simultaneously sets the timer (FIG. 1; 109) to measure the roaming period and starts buffering the signalling addressed to the base station to the signalling memory of the mobile exchange (FIG. 1; 108). If inband signalling is used, the radio resource managing unit RAHA may estimate, on the basis of the state of the channels, the time needed for finding a new signalling channel and set the timer accordingly (FIG. 1; 109). If the timer resets to zero before a new control channel has appeared, the radio resource managing unit RAHA stops the storing of signalling messages in the signalling memory (FIG. 1; 108), destroys the file in respect of said base station and, if inband signalling is used, commands the mobile phones to resume normal hunting procedures to find a base station.

Figure 4:
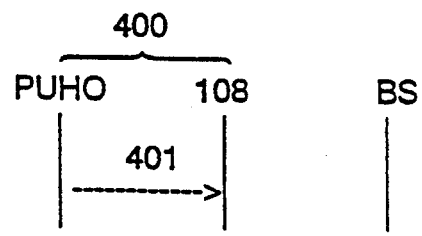

FIG. 4 illustrates storing of signalling messages 401 sent by the call control unit PUHO of a mobile exchange 400 (FIG. 1) in the signalling memory 108 (FIG. 1; 108) of the mobile exchange (FIG. 1) for the roaming period. All the signalling messages that cannot be routed to a subscriber station since the subscriber station still searches for a suitable signalling channel, listening to the channels of the original base station, are stored in the signalling memory (108) of the mobile exchange. The information contained in these signalling messages is utilized in establishing a call if a subscriber station starts to establish a telecommunication link with another subscriber station via a new signalling channel of the original base station.

Figure 5:
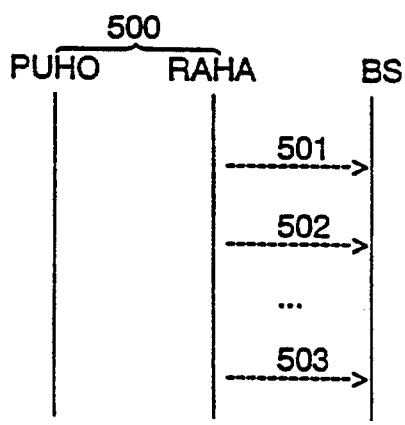
FIG. 5 shows a signalling and transaction diagram of a situation where a traffic channel that has been allocated for a call is released within the roaming period.

FIG. 5 shows a signalling and transaction diagram in a situation where a traffic channel that has been allocated for a call is released within the roaming period. A traffic channel of the original base station allocated for a call is released within the roaming period and the radio resource managing unit RAHA of a mobile exchange 500 is notified accordingly. The radio resource managing unit RAHA initializes the free base station resource converting it to a signalling channel and, where inband signalling is concerned, commands 501 the mobile phones from the old signalling channel to the new signalling channel. Where inband signalling is not concerned, i.e. if inband signalling channels are not available, the radio resource managing unit waits for the mobile phones to move to a new signalling channel on the basis of their channel paging algorithm, i.e. hunting procedure. In both cases the mobile exchange 500 starts to transmit signalling data 502, 503 stored in the signalling memory (FIG. 1; 108) to the mobile phones via a new signalling channel when said new signalling channel is available.

Figure 6:
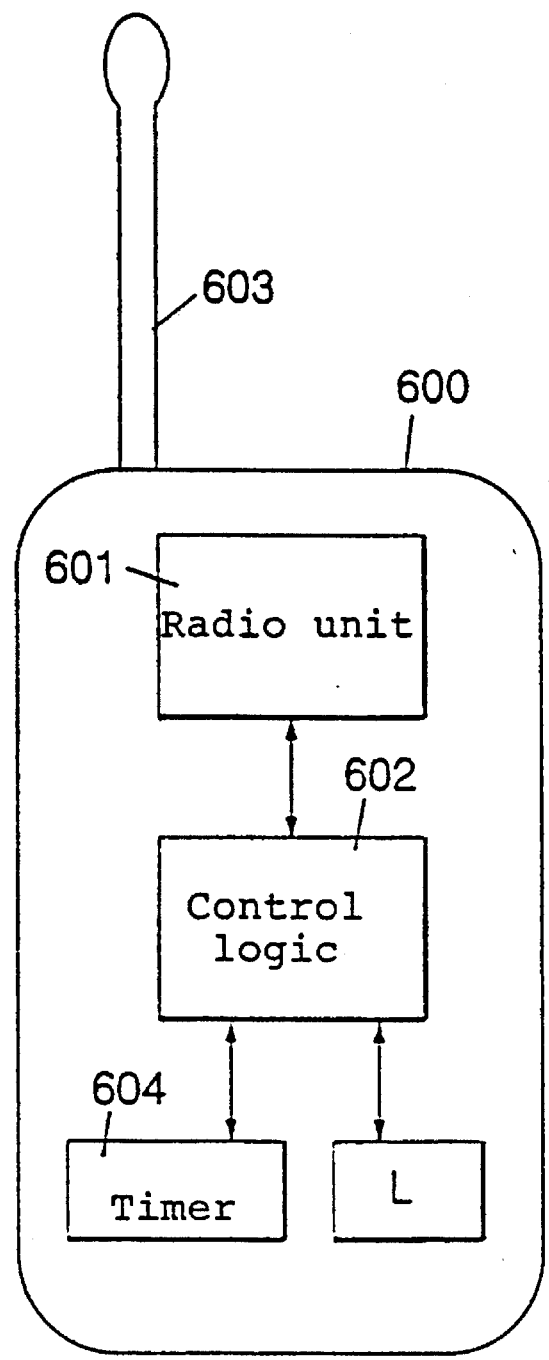
FIG. 6 shows a subscriber station or radio terminal equipment according to the invention.

FIG. 6 shows a subscriber station or radio terminal equipment 600 according to the invention. The radio terminal equipment comprises a radio unit 601, control logic 602 and an antenna 603. Below is first described the operation of a mobile phone when inband signalling is not in use in the system. The mobile phone 600 keeps a list L of potential signalling channels of its base station site (in FIG. 1, BS 101), i.e. of the base station whose signalling channel or traffic channels the subscriber station listens to. The system instructs the mobile phones in the selection of base stations by indicating, by means of broadcast messages (FIG. 7a) sent at regular intervals on the signalling channel, which base stations are adjacent to the base station of the signalling channel. The broadcast message contains information about the frequency of the current signalling channel of the adjacent base station (field 704) and the identifier of the adjacent base station (field 705).

In the list L the mobile phone enters the channels that have its own base station identifier and the signalling channel that is currently used.

When a signalling channel has been assigned to a mobile phone and the mobile phone then receives a message indicating that the signalling channel is converted for use as a traffic channel, i.e. the base station sends a message by which said signalling channel is assigned to another subscriber station as a traffic channel, the mobile phone shifts to a mode where it attempts to find a new signalling channel in its own base station site.

This is implemented such that the control logic of the mobile phone adjusts the timer 604 of the mobile phone 600 to transmit a signal when the roaming period has ended. A roaming period is the time the subscriber station is allowed to search the channels of the original base station for a free signalling channel. Subsequently, the control logic 602 pages the channels on the list L, tunes its radio unit to the frequency of each channel in succession and monitors whether the radio traffic transmitted by the base station on the channel is typical of a signalling channel. The paging of the list L continues until a) the timer 604 indicates that the roaming period has ended, whereby the control logic resumes the normal hunting procedures, or b) the list shows that the channel currently monitored is a signalling channel of the current base station, i.e. the radio traffic detected by the subscriber station on said channel is typical of a signalling channel.

In the following the operation of a mobile phone is described in a situation where inband signalling is used. Here a mobile phone control unit 601 does not need a timer 604, nor a list L.

When a mobile phone is in a state where a signalling channel has been assigned to it and it then receives a message indicating that the signalling channel is converted for use as a traffic channel, the mobile phone shifts to a mode where it listens only to the inband signalling on the current signalling channel.

The control logic 602 brings the radio unit 601 to a mode where it informs the control logic 602 of its signalling state that is accomplished via said inband signalling channel. When the control logic 602 is in an inband listening mode, it does not attempt to transmit signals concerning new calls. The system on the other hand transmits signals concerning new calls only to a limited extent on the channel.

The mobile phone 600 leaves the inband listening mode when a) the base station requests it to move to another signalling channel (FIG. 7c) since a new control channel has appeared in that particular base station site and all signalling traffic is to be transferred to said channel;

b) the base station BS sends a control message (FIG. 7b), on the basis of which the mobile phone resumes the normal base station hunting procedures; or when c) the radio unit 601 detects problems in the inband signalling: e.g. the carrier disappears or the bit error rate exceeds the threshold value.

Figure 7A:
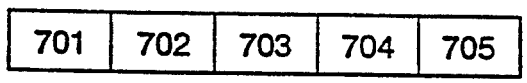
FIG. 7a illustrates a broadcast message by which information about the neighbouring base stations is passed to the subscriber stations.

FIG. 7a illustrates a broadcast message by which information about the neighbouring base stations is passed to the subscriber stations. The message comprises at least the following fields: a message identifier 701 (=broadcast), an address field 702, which may encompass all mobile phones, a subidentifier 703 indicating that the message concerns a neighbouring base station site, data 704 about the frequency of the signalling channel of the neighbouring base station, and an identifier 705 of the neighbouring base station.

Figure 7B:
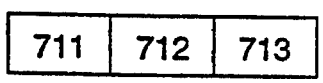
FIG. 7b illustrates a message according to the invention by which the system commands the mobile phones to leave the inband listening mode.

FIG. 7b illustrates a message according to the invention by which the system commands the mobile phones to leave the inband listening mode. The message comprises at least the following fields: a message identifier 711, which indicates that the message is a broadcast message, an address field 712, which again encompasses all mobile phones, and a subidentifier 713, which indicates that the message instructs to leave the listening mode.

Figure 7C:
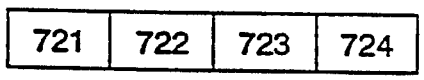
FIG. 7c illustrates a message according to the invention announcing a new signalling channel, the message being sent on an inband signalling channel.

FIG. 7c illustrates a message according to the invention announcing a new signalling channel, the message being sent on an inband channel. The message comprises at least the following fields: a message identifier 721, which is again "broadcast", an address field 722, which again indicates that all mobile phones are suitable receivers, a subidentifier 723, which indicates that the identifier belongs to a message indicating the appearance of a new signalling channel, and frequency data 724 about the new signalling channel.

Figure 7D:
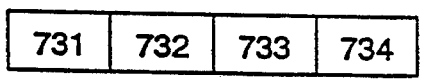
FIG. 7d illustrates a message according to the invention setting the roaming period.

FIG. 7d illustrates a message according to the invention setting the roaming period. The message comprises at least the following fields: a message identifier 731, which is again "broadcast", an address field 732, which again indicates that all mobile phones are receivers, a subidentifier 711, which indicates that the message sets the roaming period, and a time parameter 734, which shows the time as hundreds of milliseconds, e.g. 0-nn.

Figure 8:
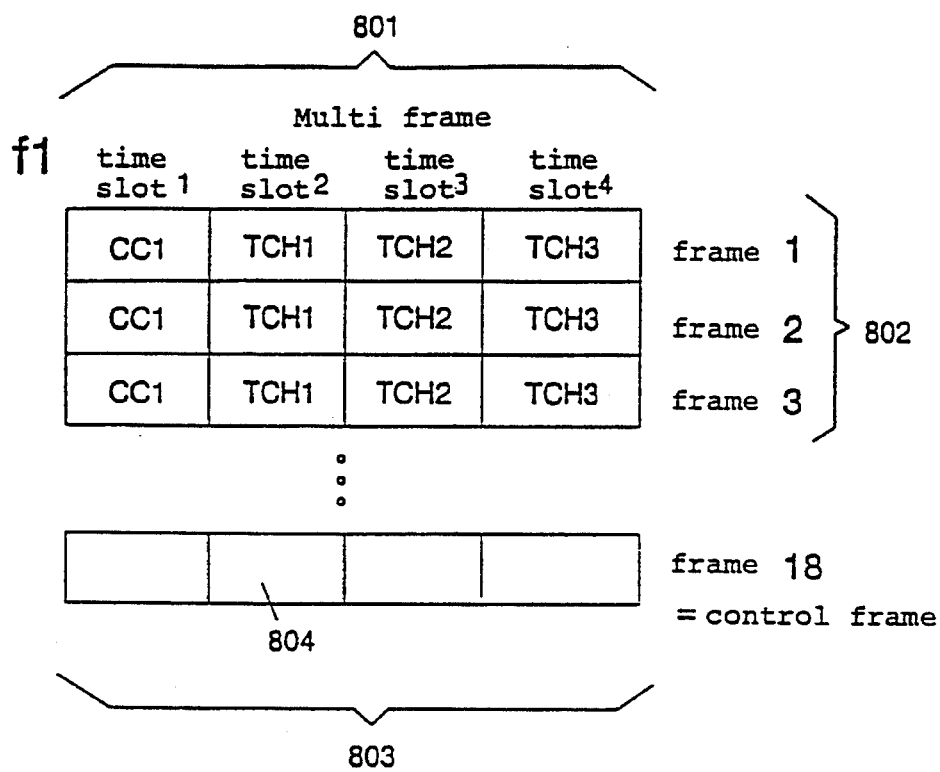
FIG. 8 shows a frame structure of a TDMA system.
Figure 9:
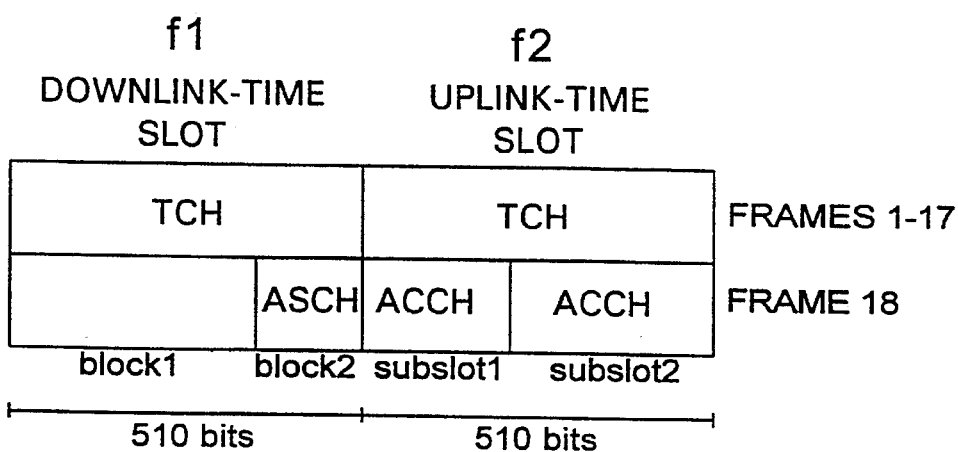
FIG. 9 shows an example of an inband signalling channel of a traffic channel in a TDMA system.

FIG. 8 shows a frame structure of a TDMA system, in which one carrier frequency f1 may have e.g. four speech channels, i.e. a signalling channel CC1 and traffic channels TCH1, TCH2, TCH3, each of which is located in its own time slot 1 to 4. These four time slots form one multiframe 801. Each time slot 1 to 4 is divided into shorter periods or frames 1, 2, 3 to 18; 802. Any one of the time slots may be a signalling time slot, but here time slot 1 is regarded as a signalling time slot, i.e. a control channel. The first seventeen frames (frames 1 to 17) of the other time slots are allocated to traffic channels and the following frame (frame 18) is a control frame, which comprises the inband signalling channels 803 of these traffic and signalling channels. In FIG. 9, time slot 2, 804 of the control frame is shown in greater detail by way of example. In the method according to the invention this time slot is used for transmitting data indicating that one of the channels used as a traffic channel between a base station and subscriber stations has been converted to a signalling channel.

FIG. 9 shows an example of an inband signalling channel of a signalling channel that has been converted to a traffic channel in a TDMA system. We are here concerned with the 18th frame of the TDMA multiframe, i.e. the control frame, and especially time slot 2, 804 of the control frame, also shown in FIG. 8. Here a downlink time slot, i.e. information from a base station to a subscriber station, is transmitted at a frequency f1 and an uplink time slot, i.e. information from a subscriber station to a base station, is transmitted at a frequency f2. FIG. 8 shows that each multiframe first has frames 1 to 17, in which time slots 2, 3 and 4 function as traffic channels and time slot 1 as a signalling channel CC1. In frame 18, i.e. the control frame, each time slot is divided into subslots or blocks. Block 2, for example, has an associated signalling channel ASCH; in this subslot, e.g. traffic channel-specific signalling can be transmitted. In the present invention, said sub-slot is used for transmitting a message indicating that one of the channels used as a traffic channel between a base station and subscriber stations has been converted to a signalling channel and for transmitting information about the identity of the converted channel.

Figure 10:
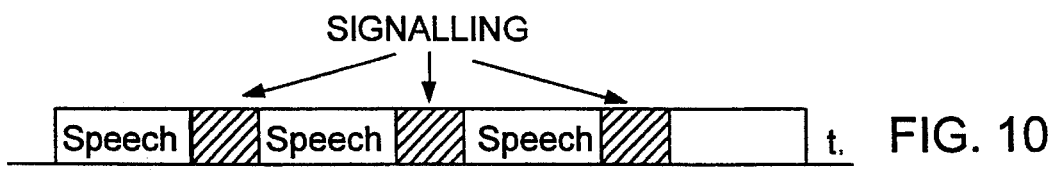
FIG. 10 shows an example of channel-specific signalling implemented in the time slots of frequency divided traffic channels.

FIG. 10 shows an example of channel-specific signalling implemented in the time slots of the frequency divided traffic channels. Information transmitted at a certain frequency is there time divided such that speech (SPEECH) is transmitted in one period of time and signalling (SIGNALLING) in another. The signalling may e.g. indicate that one of the channels used as a traffic channel between a base station and subscriber stations has been converted to a signalling channel and contain information about the identity of the converted channel.

The drawings and the specification associated therewith are to be understood only as illustrating the idea of the invention. The method of the invention may vary in its details within the scope of the attached claims. Although the invention is described above mainly in connection with radio systems and, in particular, of PMR systems, the method according to the invention may also be used in telecommunication systems of other kinds.

I claim:

1. A method of searching for a signalling channel in a radio system comprising a mobile exchange, base stations connected therewith, subscriber stations that are connected with the base stations and communicate with the radio system via the channels of the base station via traffic channels and non-dedicated control channels; the method comprising the following steps:

a first subscriber station registered in a first base station listens to a signalling channel of the first base station, the first subscriber station sends a call set-up request that contains signalling data to the radio system, and the radio system stores the signalling data transmitted by the first subscriber station;

the radio system allocates said signalling channel to a second subscriber station for use as a traffic channel since the other channels of the first base station are busy;

the first subscriber station receives a message indicating that the signalling channel used by the first subscriber station is assigned as a traffic channel for communication between the second subscriber station and the first base station;

the first subscriber station stays to listen for a predetermined time to each channel of the first base station in succession, tuning its radio unit to a channel and monitoring whether the first base station is transmitting on the signalling channel that has been allocated as a traffic channel; and if said signalling channel is released within said predetermined time, the radio system establishes a telecommunication link in accordance with said signalling data, continuing the connection establishment between the first subscriber station and the radio system from where it ended when the signalling channel was allocated to another subscriber station as a traffic channel.

2. A method of searching for a signalling channel in a radio system comprising a mobile exchange, base stations connected therewith, subscriber stations that are connected with the base stations and communicate with the radio system via the channels of the base station via traffic channels and non-dedicated control channels; the method comprising the following steps:

a first subscriber station registered in a first base station listens to a signalling channel of the base station;

the first subscriber station sends a call set-up request that contains signalling data to the radio system, and the radio system stores the signalling data transmitted by the first subscriber station;

the radio system allocates said signalling channel to a second subscriber station for use as a traffic channel since the other channels of the first base station are busy;

the first subscriber station receives a message indicating that the signalling channel used by the first subscriber station is assigned as a traffic channel for communication between the second subscriber station and the first base station;

the first subscriber station stays to listen for a predetermined time to the inband signalling on said signalling channel that has been converted to a traffic channel;

if said signalling channel is released within a predetermined time, the radio system establishes a telecommunication link in accordance with said signalling data, continuing the connection establishment between the first subscriber station and the radio system from where it ended when the signalling channel was allocated to another subscriber station as a traffic channel.

\* \* \* \* \*